June 14, 1949.　　　　M. B. HERBRICK　　　2,472,826
TIRE CHAIN RELEASE DEVICE
Filed Feb. 9, 1948

INVENTOR.
Milton B. Herbrick.
BY
Sam J. Slotsky
ATTORNEY

Patented June 14, 1949

2,472,826

UNITED STATES PATENT OFFICE 2,472,826

TIRE CHAIN RELEASE DEVICE

Milton B. Herbrick, Sterling, Colo.

Application February 9, 1948, Serial No. 7,144

1 Claim. (Cl. 152—213)

My invention relates to a tire chain device.

An object of my invention is to provide a release device which will allow a tire chain to be released from a tire, and whereby the inner side chain can be conveniently removed.

A further object of my invention is to provide means for releasing the inner chain in a simple arrangement which requires very few parts, and which works cooperatively with the end cross chain for the releasing function.

A further object of my invention is to provide a device having the above characteristics which can be readily attached, or detached.

Figure 1:
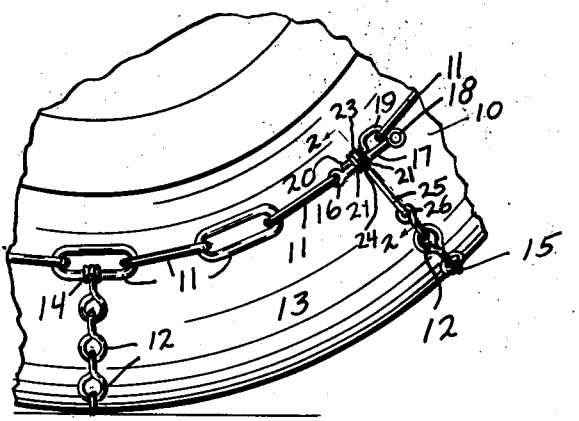
Figure 2:
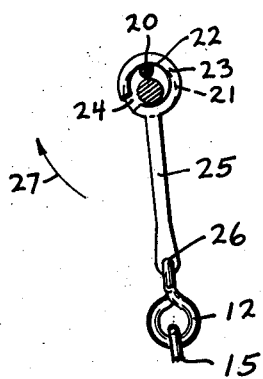

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a side elevation of the releasing device as observed from the inside of a tire, and Figure 2 is an enlarged sectional view taken along the lines 2—2 of Figure 1.

My invention contemplates a simple arrangement for detaching the inner, annular side chain of a tire chain arrangement, which arrangement is operatively connected with one of the cross chains.

I have used the character 10 to designate the inner side wall of a tire casing, or the side which is facing away from the outside of the vehicle. I have further used the character 11 to designate a series of chain links which provide the inner side chain of the chain arrangement, and I have used the character 12 to designate the usual cross links which straddle the tire 13, such cross links being attached at 14 to either side, it being understood that a further series of links 11 are positioned on the outside of the tire. I have further used the character 15 to designate the end cross chains including the aforesaid twisted links 12. The cross chains 15 are attached at their outer ends to the commonly used ring or clamp, which provide attaching means for attachment to the end link 11 of the outside chain. This construction is well-known in the art and need not be illustrated herein.

One of the end links 11 is pivotally attached at 16 to the bar 17, and pivotally attached to the bar 17 at 18 is the substantially U-shaped member 19 which is circular in cross section, and which terminates in the portion 20 which normally lies against the bar 17 and is parallel therewith. Attached to the bar 17 are a pair of collars 21, which include recesses 22 for the reception of the portion 20.

Positioned between the collars 21 is the ring 23 having an opening at 24, and extending integrally from the ring 23 is the bar 25 which is attached at 26 to the end link 12 of the cross chain 15.

It will be noted that when the cross chain is in place, that the right hand end link 11 is firmly retained in place due to its engagement within the member 19, such member being locked by means of the ring 23.

However, when it is desired to remove the chain from the tire, the outer end of the cross chain 15 is detached from the outer side wall chain, whereby the operator can then swing the bar 25 in the direction of the arrow 27 until the opening 24 in the ring 23 registers with the portion 20, thus allowing pivotal movement of the member 19 and release of the end link 11, whereby the chain can then be removed.

The arrangement can also be pivoted by means of the cross chain 15 itself if desired.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A tire chain release device including an inner side chain divided and forming two end portions, a cross chain, and clamp means including a clamp member connected to one end portion of the inner side chain, said clamp means including a keeper pivotally attached thereto, said keeper provided with a recess receiving a link of the other end portion of the side chain, an arm having a collar receiving said clamp means and said keeper, said collar having a releasing opening, said cross chain being attached to said arm whereby release of said cross chain will provide means for rotating said arm so that said keeper will be released through said opening, for releasing said link and said inner side chain from a tire.

MILTON B. HERBRICK.

No references cited.